US011557307B2

(12) United States Patent
Boeen et al.

(10) Patent No.: US 11,557,307 B2
(45) Date of Patent: Jan. 17, 2023

(54) USER VOICE CONTROL SYSTEM

(71) Applicant: Listen AS, Oslo (NO)

(72) Inventors: Anders Boeen, Oslo (NO); Snorre Vevstad, Oslo (NO); Aksel Kvalheim Johnsby, Oslo (NO); Rafael Ignacio Gallegos, Oslo (NO); Soreti Darge Gemeda, Dal (NO)

(73) Assignee: LISTEN AS, Oslo (NO)

( * ) Notice: Subject to any disclaimer, the term of this patent is extended or adjusted under 35 U.S.C. 154(b) by 95 days.

(21) Appl. No.: 17/073,034

(22) Filed: Oct. 16, 2020

(65) Prior Publication Data

US 2021/0118461 A1  Apr. 22, 2021

Related U.S. Application Data

(60) Provisional application No. 62/923,567, filed on Oct. 20, 2019.

(51) Int. Cl.
| | | |
|---|---|---|
| *G10L 21/0216* | (2013.01) | |
| *G10L 21/013* | (2013.01) | |
| *G10L 17/06* | (2013.01) | |
| *G10L 15/22* | (2006.01) | |

(52) U.S. Cl.
CPC .......... *G10L 21/0216* (2013.01); *G10L 15/22* (2013.01); *G10L 17/06* (2013.01); *G10L 21/013* (2013.01); *G10L 2015/223* (2013.01); *G10L 2021/02163* (2013.01)

(58) Field of Classification Search
None
See application file for complete search history.

(56) References Cited

U.S. PATENT DOCUMENTS

| 6,493,687 | B1 | 12/2002 | Wu | |
|---|---|---|---|---|
| 6,766,295 | B1 | 7/2004 | Murveit | |
| 7,020,292 | B1 * | 3/2006 | Heubel | H03G 3/342 |
| | | | | 381/94.1 |
| 10,535,364 | B1 * | 1/2020 | Zhong | H04R 1/02 |
| 10,595,151 | B1 * | 3/2020 | Chen | H04R 3/005 |
| 10,614,827 | B1 * | 4/2020 | Korjani | G10L 21/0364 |
| 10,771,888 | B1 * | 9/2020 | Oishi | H04R 1/1075 |
| 10,841,693 | B1 * | 11/2020 | Ganeshkumar | G10K 11/34 |

(Continued)

OTHER PUBLICATIONS

Brouckxon, Henk, Werner Verheist, and Bart De Schuymer. "Time and frequency dependent amplification for speech intelligibility enhancement in noisy environments." Ninth Annual Conference of the International Speech Communication Association. 2008. (Year: 2008).*

*Primary Examiner* — Douglas Godbold
(74) *Attorney, Agent, or Firm* — Schwabe, Williamson & Wyatt, P.C.

(57) ABSTRACT

Embodiments include techniques and objects related to a wearable audio device that includes a microphone to detect a plurality of sounds in an environment in which the wearable audio device is located. The wearable audio device further includes a non-acoustic sensor to detect that a user of the wearable audio device is speaking. The wearable audio device further includes one or more processors communicatively to alter, based on an identification by the non-acoustic sensor that the user of the wearable audio device is speaking, one or more of the plurality of sounds to generate a sound output. Other embodiments may be described or claimed.

19 Claims, 11 Drawing Sheets

(56) References Cited

U.S. PATENT DOCUMENTS

| | | | |
|---|---|---|---|
| 10,856,087 B2 * | 12/2020 | Pedersen | H04R 25/507 |
| 2004/0230420 A1 | 11/2004 | Kadambe | |
| 2010/0246850 A1 * | 9/2010 | Puder | G10L 21/0208 381/94.1 |
| 2011/0268288 A1 * | 11/2011 | Tanaka | G10L 21/0208 381/71.1 |
| 2014/0029762 A1 * | 1/2014 | Xie | H04R 5/027 381/94.1 |
| 2014/0244245 A1 * | 8/2014 | Briot | G10L 21/0208 704/211 |
| 2015/0185161 A1 | 7/2015 | Gettings | |
| 2015/0245129 A1 * | 8/2015 | Dusan | G10L 21/0208 381/71.6 |
| 2015/0302728 A1 | 10/2015 | Gettings | |
| 2015/0358718 A1 | 12/2015 | Kaller et al. | |
| 2016/0111113 A1 * | 4/2016 | Cho | G10L 21/0208 704/250 |
| 2016/0165336 A1 | 6/2016 | Di Censo et al. | |
| 2016/0188285 A1 | 6/2016 | Luk et al. | |
| 2017/0075422 A1 | 3/2017 | Sun et al. | |
| 2017/0263267 A1 * | 9/2017 | Dusan | H04R 1/1083 |
| 2017/0295272 A1 | 10/2017 | Gan et al. | |
| 2018/0286372 A1 | 10/2018 | Beckman | |
| 2019/0035415 A1 * | 1/2019 | Lu | G10L 21/0232 |
| 2019/0045298 A1 * | 2/2019 | Klemme | A61B 5/721 |
| 2019/0172476 A1 * | 6/2019 | Wung | G10L 21/0232 |
| 2019/0272842 A1 * | 9/2019 | Bryan | G10L 21/0272 |
| 2020/0043519 A1 | 2/2020 | Ramos | |
| 2020/0081683 A1 | 3/2020 | Cremer et al. | |
| 2020/0092644 A1 | 3/2020 | Alders et al. | |
| 2020/0111472 A1 * | 4/2020 | Kurz | G10K 11/17854 |
| 2020/0118544 A1 | 4/2020 | Lee et al. | |
| 2020/0128317 A1 * | 4/2020 | Feldman | H04R 1/04 |
| 2020/0151519 A1 | 5/2020 | Anushiravani et al. | |
| 2020/0152036 A1 | 5/2020 | Safavi | |
| 2020/0156912 A1 | 5/2020 | Carlei | |
| 2020/0167631 A1 | 5/2020 | Rezgui | |
| 2020/0184985 A1 | 6/2020 | Nesta et al. | |
| 2020/0184991 A1 | 6/2020 | Cleve | |
| 2020/0186378 A1 | 6/2020 | Six et al. | |
| 2020/0241834 A1 | 7/2020 | Boeen et al. | |
| 2020/0258539 A1 * | 8/2020 | Shim | H04R 3/005 |
| 2020/0260198 A1 | 8/2020 | Andersen et al. | |
| 2020/0285249 A1 | 9/2020 | Woods | |
| 2020/0293270 A1 | 9/2020 | Boeen et al. | |
| 2020/0329297 A1 * | 10/2020 | Dutt | G10L 15/187 |
| 2021/0044889 A1 * | 2/2021 | Liu | G06F 3/165 |
| 2021/0106236 A1 * | 4/2021 | Tran | A61B 5/1117 |
| 2021/0141597 A1 | 5/2021 | Atarot | |
| 2021/0160642 A1 * | 5/2021 | Eronen | H04S 7/305 |
| 2021/0232360 A1 * | 7/2021 | Gunawan | G10L 25/51 |
| 2022/0103951 A1 * | 3/2022 | Stamenovic | H04R 1/1091 |

* cited by examiner

USER VOICE CONTROL SYSTEM

CROSS-REFERENCE TO RELATED APPLICATION

This application claims priority to U.S. Provisional Patent Application No. 62/923,567, titled "USER VOICE CONTROL," filed Oct. 20, 2019, the contents of which are incorporated herein in their entirety.

BACKGROUND

When speaking, one may hear a mixture of the sound emitted from their mouths and the vibrations within their head/ears. This is why a person's voice may sound differently in recordings as compared to what a person is used to under normal circumstances. Most people may find it uncomfortable to listen to their own voice through a speaker because the mixture of sounds may be different than what the user is used to. This difference may translate to an undesirable difference in perception of the sound of the user's voice.

DETAILED DESCRIPTION

Figure 1:
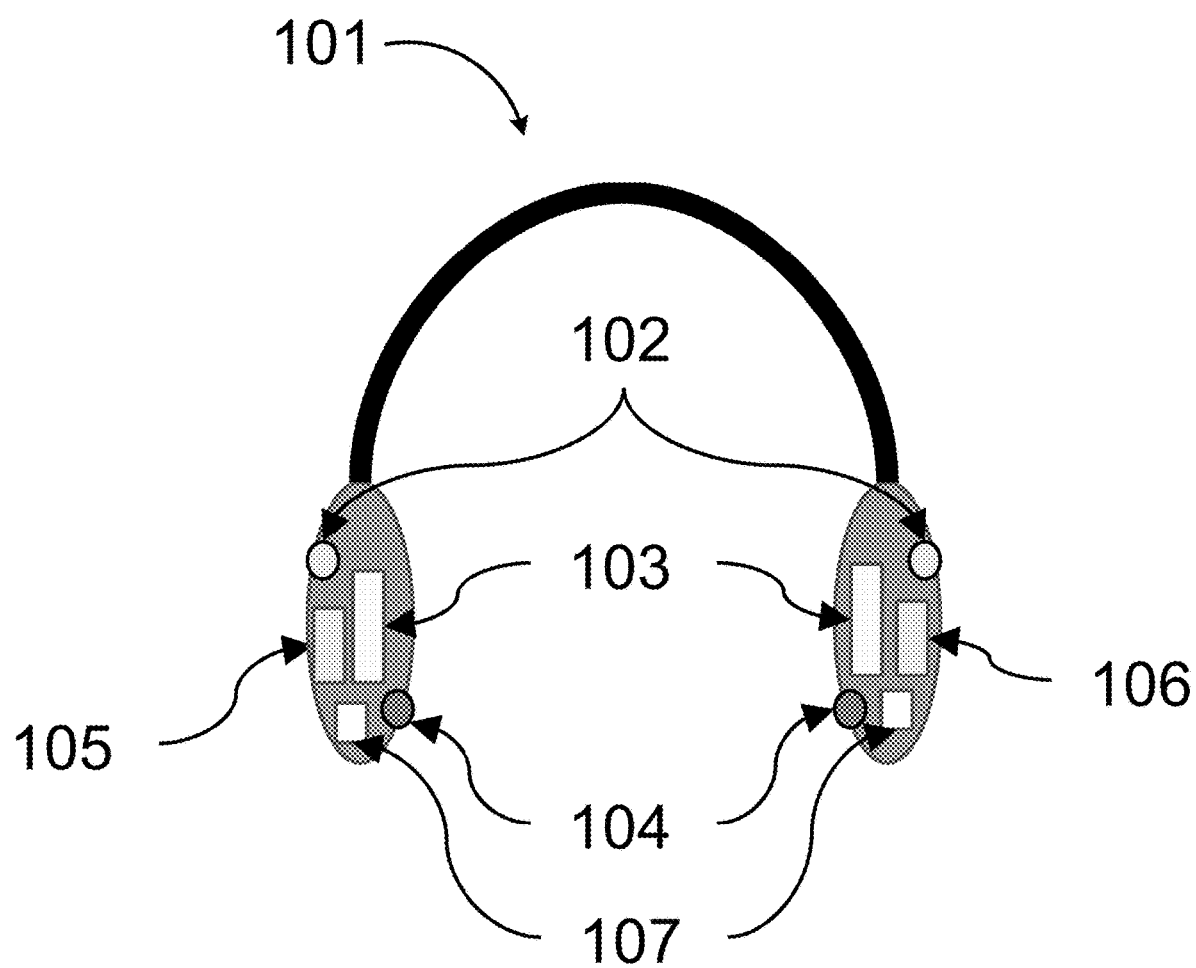
FIG. 1 depicts an example wearable audio device, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

The term "module" is used herein to refer to various elements of various of the Figures. In general, the term "module" is intended to refer to analog circuitry, digital circuitry, hardware, software, firmware, or some combination thereof. In some embodiments, certain of the Figures provide a more detailed view of elements that are referred to as "modules."

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

As previously noted, legacy wearable audio devices such as headphones, hearing-aids, headsets, earbuds, etc. may cause a user to perceive their voice as sounding differently than they are used to, and this perception may be undesirable. More specifically, in legacy wearable audio devices, the user's voice may get picked up by the wearable audio device, and subsequently amplified. The voice that the user hears may not match the voice that the user expects to hear. This difference may create an un-natural experience for the user when speaking. Embodiments herein may reduce, mitigate, or eliminate this difference.

Specifically, embodiments herein relate to technology which may reduce or mitigate the self-voice perception when using a wearable audio device. Embodiments may use a variety of sensors and algorithms to detect when the user is speaking, for example based on audio signals or mechanical vibrations induced by the user.

Embodiments herein may include a function referred to as UVC, which may relate to how one or more sounds are altered during playback based on detection of a user's voice. UVC may be supported by a function referred to as SVAD. SVAD may refer to the operations or functions of the wearable audio device by which a user's voice may be detected.

SVAD and UVC may be used to perform different functions. One such function may be to alter the sounds to reduce or alter the user's voice when sound is played back to the user through the wearable audio device. For example, the wearable audio device may function as a hearing aid which is able to record sounds within the environment in which the user is located, and play those sounds back to the user. However, when the device detects that the user is speaking, the one or more of the sounds may be altered to, for example, remove the user's voice from the audio stream. Alternatively, the user may desire that their voice be amplified, or made to sound more natural, and so the wearable audio device may additionally or alternatively be configured to alter the audio stream to cause this change to the user's audio.

As an alternative, SVAD and UVC may be used to detect and amplify the user's voice while removing background noise from the audio stream. The altered audio stream may then be output in, for example, a phone call or some other function where it is desirable to clearly hear the user's voice. Similarly, such a function may be useful for gaming, online chatting, etc.

It will be understood that the above use cases are intended as non-limiting examples, and other use cases may be possible which may include one or both of the above-described functions. For example, in some embodiments it may be desirable to remove a user's voice from their own audio stream, while accenting the user's voice in the audio stream that is output by the wearable audio device in a phone call. Other variations may be present.

Overview of Embodiments

In one embodiments, the SVAD and UVC functions may be implemented on a platform that includes one or more of hardware, software, and firmware, with algorithms running on a processor. The algorithm may be executed on a wearable audio device such as a headset, an earbud, a pair of earbuds, etc. The wearable audio device may be, for example Bluetooth® enabled or be compatible with one or more other wireless protocols. The wearable audio device may include one or more microphones, at least one speaker, at least one battery, and one or more transceivers operable to communicate with a mobile device, wife-router, personal computer, or a personal assistant device. The wearable audio device may also have a transceiver that can communicate with a cell tower directly. The wearable audio device may also include one or more processors, processor cores, processing units, etc. such as a central processing unit (CPU) or a core of a multi-core processor. The wearable audio device may further include one or more sensors such as an accelerometer, a piezoelectric sensor, a vibration sensor, etc. which is operable to detect whether a user is speaking.

The wearable audio device may further include speakers which may be able to output sound to a user of the wearable audio device. Additionally or alternatively, the wearable audio device may include a wired or wireless output that is configured to provide an analog output or a digital signal to another device such as a cellular telephone, a personal digital assistant (PDA), a tablet, or some other device of a user of the wearable audio device. In other embodiments, the wearable audio device may additionally or alternatively include other sound outputs.

In some embodiments, the wearable audio device may be operated through a variety of inputs. One such input may be through a mobile phones user interface (e.g. graphical user interface (GUI), voice commands, motion commands, eye movements etc.). For example, the mobile phone may be running an application which has a GUI that includes an option to adjust the algorithm parameters (voice volume, reverberation, equalizer, pitch correction etc.). The application may transmit the algorithm parameters to a database located in a server. On the server, a neural network may predict optimal parameters for the wearable audio device based on the user feedback, and the parameters may be stored in the database in real time. The new predicted algorithm parameters from the neural network may then be transmitted back into the headset or earbud. It will be understood that the description of this modification is described with respect to a server remote from the wearable audio device or the mobile device, however, in other embodiments the database and/or neural network may be located at least partially in the mobile device or the wearable audio device.

Another such input may be based on the user's own voice detection by vibration sensors and microphones. For example, the user may be able to make a noise (e.g., speech or some other noise) which may allow the user to select how much they would like to attenuate or reduce self-voice, add reverberation or adjust frequency output, etc. in order to accommodate the sound to the users own preference. In some embodiments, the wearable audio device may have one or more inputs such as a button, a switch, a touch-sensitive sensor, etc. which may allow the user to input one or more commands such as a change in volume, an on/off mode, etc.

In one embodiment, detection of how a user is speaking may be based on use of a vibration sensor with a mechanical contact point which touches human skin, and transfers the voice vibrations to the vibration/accelerometer sensor. The vibration sensors in use may be accelerometers with one or more axis, piezoelectric vibration sensor with one or more axis, or some other type of vibration sensor. A 3-axis vibration sensor/accelerometer may be applied in order to detect movement or motion caused by the user or the user's environment. By calculating the magnitude of gravity, one can estimate if vibrations/acceleration are caused by external forces, which in turn can corrupt readings from the sensor related to detecting user's voice. Specifically, if the gravity magnitude is not 1 g (e.g., approximately 9.8 meters per second squared), then external acceleration may be present, and vibration has been influenced by external vibration, and therefore it may be desirable to rely less on the vibration sensor/accelerometer. In one embodiment, more than one vibration sensor may be used in order to mitigate the corruption of sensor data caused by user-error, physiological differences, or some other factor which may cause low signal output or sensor failure.

Overview of System Architecture

The architecture of the wearable audio device may include one or more microphones and one or more non-acoustic sensors such as a vibration sensor or accelerometer. The microphone(s) and sensor(s) may provide inputs to a SVAD algorithm. The SVAD algorithm may detect when a user is talking or when other people in the environment in which the wearable audio device is located are talking. The SVAD may use a fixed delay and gain to compensate for delay between the microphone and vibration/accelerometer sensor, or it may use an adaptive Least Mean Square (LMS) Filter to compensate for the delay and gain. After the data from the microphone and sensor are synchronized and normalized, detection of the user's own voice may be identified either in time domain or frequency domain for more advanced detection using multiple frequency bands. In some embodiments, a machine-learning neural network may also be used to predict if the user is talking or not, based on the vibration and microphone signals in the time domain and/or in the frequency domain.

If a 3-axis accelerometer is used, as described above, gravity magnitude may be calculated to indicate if additional acceleration is present. This additional acceleration may indicate that the user is exposed to external acceleration, and therefore data from the vibration sensor might be corrupt. A check may be used to only update vibration data when gravity is around 1 g±Δ, where Δ is a defined band gap around 1 g. Hysteresis may be added to the band gap.

When the SVAD is detecting the user's voice, it may produce an output that acts as an on/off signal in time domain (e.g., affecting all audio for a specific time frame) or frequency domain (e.g., affecting only specific noises or frequency bands), or an "analog" signal to alter the sound output by the wearable audio device. For example, the wearable audio device may, based on the signal output by the SVAD, reduce or increase the users own voice, activate additional reverberation to make the voice sound more natural, add bass/treble through an equalizer, etc. Enhancing treble or bass on self-voice may compensate for hearing loss in users, allowing them to feel they can hear their own voice better and not talk as loud due to reduced hearing.

The SVAD may also be used during a phone call where gain of a microphone of the wearable audio device is reduced or turned off when the user is not talking, and then the gain is increased or turned on when the user is talking. This selective gain control may reduce the background noise that is normally recorded by a microphone during a phone call when the user is in a noisy environment such as an airport, a coffee shop, etc.

Similarly, the SVAD may function in a push-to-talk capacity when a person is talking, e.g. for use in gaming, chatting or online teleconference. Specifically, in legacy wearable audio devices, a user may be required to push a button when they would like to talk. Embodiments herein may be configured to automate this function based on the SVAD.

In some embodiments, the wearable audio device may be configured to collect user settings of the UVC algorithm, and send one or more of those settings to the cloud either through wifi or a mobile phone/mobile network. The wearable audio device or the mobile phone may append one or more of the following to the data payload: user App settings, user data, Geo-location from mobile phone, Time, User feedback, and a Unique ID (Random or fixed). This data payload may be sent to the server and appended to the database for future processing.

The server may then execute a machine-learning algorithm based on a neural network. The neural network may be trained top predict the optimal UVC parameters for the user in different environments, and then the UVC parameters may be conveyed to the wearable audio device. Additionally or alternatively, the neural network may be trained to predict UVC parameters which may be used to detect abnormal hearing problems which may be compensated for by adjusting the higher frequencies. Additionally or alternatively, if the user does not find the predicted settings to be appropriate, with the predicted settings, a user may modify one or more of the settings in an application on a mobile phone, or directly on the wearable audio device, and these modified settings may be provided to the neural network as feedback which may be used to train the neural network to predict better. It will be understood that although the neural network is described as being located in the cloud, in some embodiments the neural network may additionally or alternatively be located on a mobile device of the user, on the wearable audio device, or elsewhere.

Examples of Specific Embodiments

FIG. 1 depicts an example wearable audio device 101, in accordance with various embodiments. The wearable audio device 101 is depicted as a headset with two speakers, however it will be understood that in other embodiments the wearable audio device 101 may take the form of a single earbud, a plurality of earbuds, a headset with a single speaker, a headset with a boom-style microphone, etc. Generally, it will be understood that although the wearable audio device 101 is depicted as being symmetrical (i.e., having the same elements on either side of the wearable audio device 101), in some embodiments the wearable audio device 101 may have an element such as a microphone on only one side of the wearable audio device 101. Similarly, there may be more or fewer elements (e.g., microphones, speakers, etc.) than depicted. Generally, the example of FIG. 1 is intended as a non-limiting example configuration, and variations may be present in other embodiments.

The wearable audio device 101 may include one or more microphones 102 that are configured to record sounds of a location in which the wearable audio device is present. Said sounds may be, for example, the sound of a user's voice or other sounds.

The wearable audio device 101 may further include one or more speakers 103. In some embodiments the speakers 103 may be acoustic type speakers operated by a driver, while in other embodiments the speakers 103 may be a bone-conduction type transmitter.

The wearable audio device 101 may further include one or more sensors 104. The sensors 104 may be, for example, a vibration sensor that is designed to identify when a user is speaking. The vibration sensor may be an accelerometer, a piezoelectric sensor, or some other type of non-acoustic sensor. The sensor 104 may include a mechanical part that is in direct contact with the skin of the user such that it may pick up vibrations from the user when the user speaks. In other embodiments, the sensor 104 may be physically coupled with the user through an intermediary element such as a piece of plastic or some other element of the wearable audio device 101.

The wearable audio device 101 may further include one or more processors 105. As noted, the processor 105 may be a processor, a processing core, a microcontroller, a digital signal processor (DSP), a field-programmable gate array (FPGA), or some other type of processor that is operable to run the UVC, the SVAD, or some other algorithm.

The wearable audio device 101 may further include one or more batteries 106. The batteries 106 may be, for example, a lithium ion battery or some other type of battery. The wearable audio device 101 may further include an adjustable occlusion valve 107. The adjustable occlusion valve 107 may be a valve that is openable, e.g. by mechanical means, to relieve the occlusion effect experienced by a user of a wearable audio device. Specifically, the occlusion effect may refer to the effect experienced by a user when they are wearing an earbud-style wearable audio device that is at least partially in their ear canal, resulting in a "booming" type sound of the user's voice. By selectively opening the valve 107 when the user is talking, the occlusion effect may be reduced or eliminated.

Figure 2:
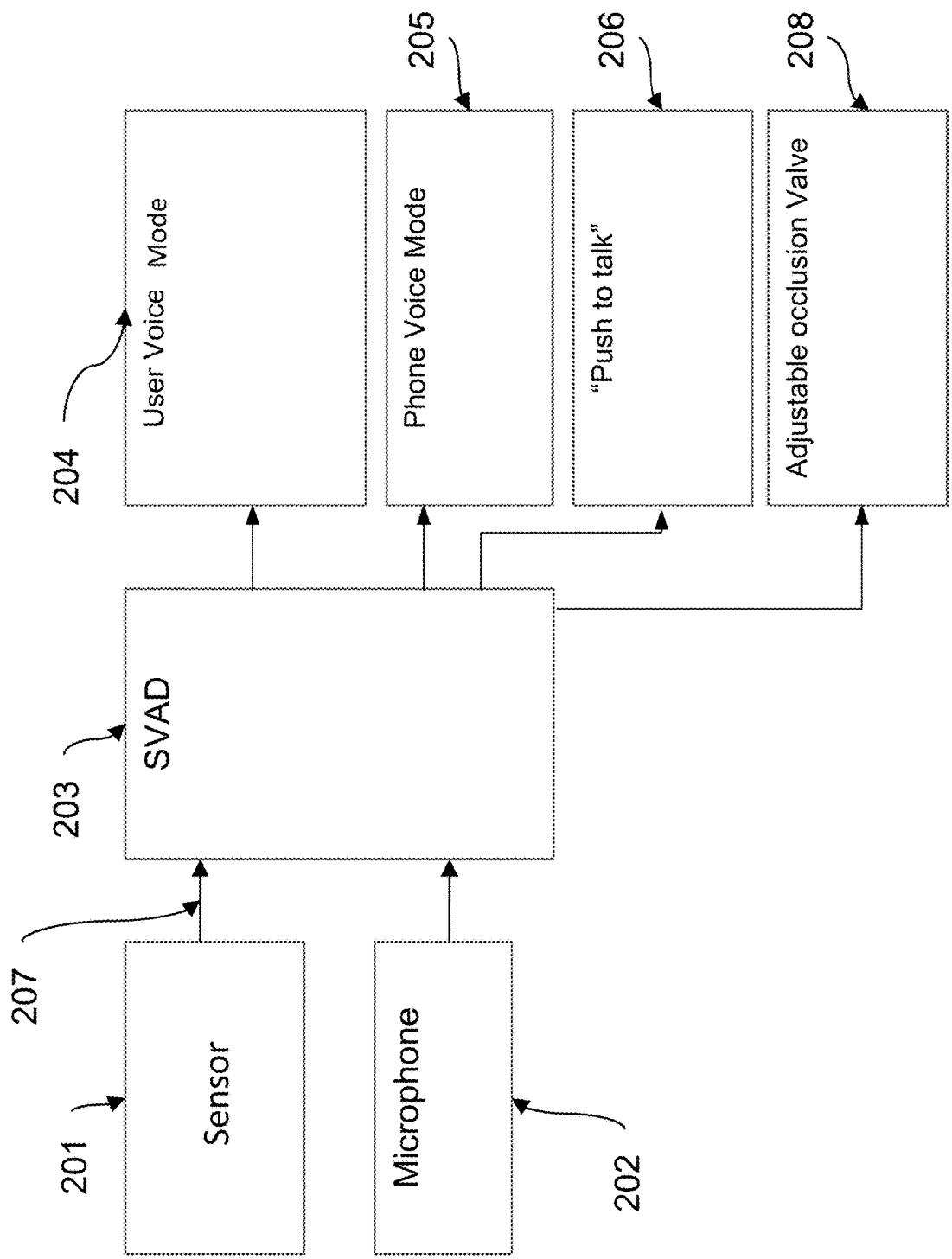
FIG. 2 depicts an example high-level conceptual architecture of a user voice control (UVC) system, in accordance with various embodiments.

FIG. 2 depicts an example high-level conceptual architecture of a UVC system, in accordance with various embodiments. Specifically, FIG. 2 is depicted as a high-level conceptual diagram to depict different signaling pathways within the UVC architecture.

The architecture may include one or more sensors 201, which may be similar to the sensor 104 of FIG. 1. The sensor(s) 201 may be a vibration sensor, an accelerometer, or some other sensor which may be a one-axis, two-axis, or three-axis device. For example, in some embodiments the sensor(s) 201 may be a microelectromechanical systems (MEMS) accelerometer with an analog or digital output, or a piezoelectric vibration sensor. In some embodiments, the sensor may be or include a camera to monitor vocal or face movements, or a gas sensor to measure respiration. In some embodiments, if a 3-axis accelerometer-based sensor is used, gravity magnitude may be calculated before a high-pass filter is used to remove direct current (DC) signals from the output. This calculation and filtering may be performed to separate DC signals (e.g., signals with a frequency of less than approximately 1 Hertz) that are used to calculate gravity magnitude from an alternating current (AC) audio signal. The sensor may output one or more of a vibration-related signal, an accelerometer-related signal, or a gravity magnitude signal. In other embodiments, the high-pass filter may remove signals related to the gravity magnitude with a different frequency, for example on the order of between approximately 10 Hertz and approximately 100 Hertz. The specific bandwidth related to the signals related to the gravity magnitude may be dependent on, for example, the specific circuit design, the type of sensor used, etc.

The architecture may additionally include one or more microphones 202, which may be similar to microphones 102. The microphone(s) 202 may be a stand-alone microphone, or an array of microphones in a beamforming configuration. If a beamforming configuration is used, the architecture may include additional circuitry which may have fixed control parameters that can be changed to adapt to the environment in which the wearable audio device is located.

The output 207 of the sensor(s) 201 and the output of the microphone(s) 202 may be provided to an SVAD module 203 which may be implemented on, for example, a processor such as processor 105. The SVAD module 203 may be configured to synchronize the outputs of the sensor(s) 201 and the microphone(s) 202. Specifically, the SVAD module 203 may be configured to detect when both the sensor(s) 201 and the microphone(s) 202 measure a user's voice. The SVAD module 203 may then output a signal to one or more other modules 204, 205, or 206. As may be seen, the output of the SVAD module 203 may additionally or alternatively be to an adjustable occlusion valve 208, which may be similar to occlusion valve 107.

It will be understood that modules 204, 205, and 206 are intended as non-limiting example modules, and each of the modules may not be present in various embodiments. Generally, the modules 204/205/206 may be implemented by a processor such as processor 105.

One such module may include a user voice mode module 204. The user voice mode module 204 may be configured to reduce or increase the volume of the user's voice that is played back to the user by speakers such as speakers 103. Specifically, the user voice mode module 204 may be configured to alter the user's voice in the audio stream which the user hears. Additionally or alternatively, the user voice mode module 204 may be configured to apply one or more effects such as reverb, tone balancing (e.g., bass or treble boost), etc.

Another such module may be the phone voice mode module 205. The phone voice mode module 205 may be activated if the user is talking on a phone, and may be configured to alter one or more sounds of the audio stream that is output by the wearable audio device to an individual that is remote from the wearable audio device, such as may occur during a phone call. In this mode, the background noise may be reduced or eliminated if a user is talking. In some embodiments, the audio stream may be entirely muted until the user begins talking, at which point the audio stream is un-muted based on detection of the user's voice.

A similar module may be the push-to-talk module 206. In some embodiments, the push-to-talk module 206 and the phone voice mode module 205 may be the same module, while in other embodiments they may be different from one another. In this embodiment, the audio stream may be un-muted based on detection of a user's voice. This function may be desirable in situations such as video games or some other situation where a user may have been required to press a button to speak in legacy embodiments.

Figure 3:
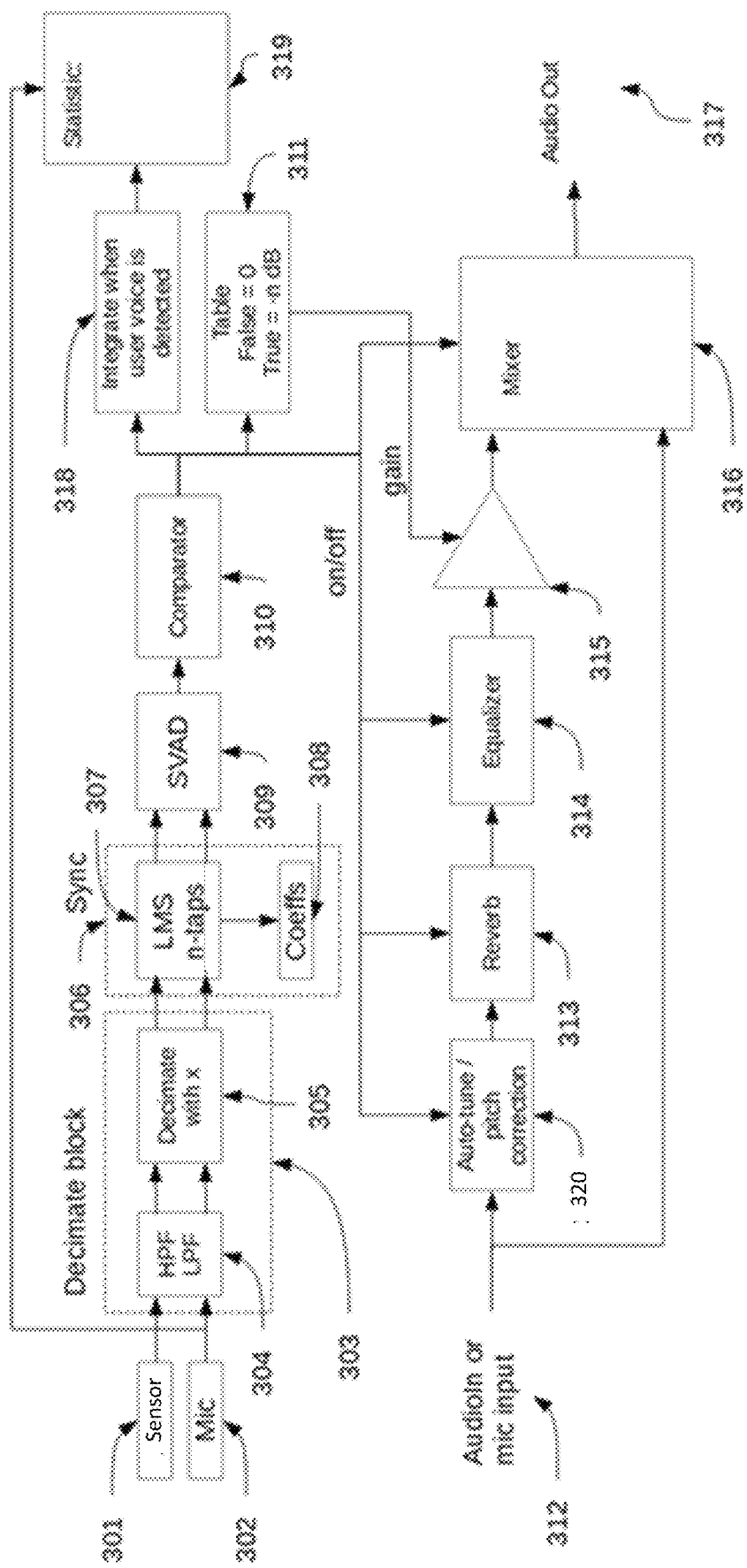
FIG. 3 depicts an example block diagram of a UVC architecture, in accordance with various embodiments.

FIG. 3 depicts an example block diagram of a UVC architecture, in accordance with various embodiments. Specifically, FIG. 3 is intended to depict an example of elements of the architecture which may provide one or more of the functions described above with respect to FIG. 2.

The architecture may include one or more sensors 301 and microphones 302, which may be similar to sensor(s) 201 and microphone(s) 202. The output of the sensor(s) 301 and microphone(s) 302 may be provided to a decimate block 303 which may include a filter 304 and a decimate module 305. The filter 304 may include a high-pass filter (HPF), a low-pass filter (LPF), a finite impulse response (FIR) filter, an infinite impulse response (IIR) filter, some combination thereof, or one or more other filters. Generally, the decimate block 303 may be to downsample the signal to a slower rate for processing. The decimate module 305 may decimate the signal down x times equal to the sensor bandwidth to remove higher frequencies that the sensor(s) 301 may not have appropriately output. The filter 304 may remove DC and anti-aliasing at higher frequencies when downsampling.

The output of the decimate block 303 may be provided to a synchronization block 306, which may synchronize the sensor(s) 301 and the microphone(s) 302 by using a delay, and then normalizing the signals by applying a gain. Specifically, the synchronization block 306 may be performed by a delay/gain block 307. The delay/gain block 307 may either use a fixed delay and gain to compensate for the delay between the sensor(s) 301 and the microphone(s) 302, or an adaptive LMS filter. In some embodiments, the LMS filter may produce n-coefficients 308 which may be saved and, in some embodiments, uploaded to an online database for future processing. It will be noted that, in other embodiments, the synchronization block 306 may be placed in the signal chain prior to the decimate block 303, which may result in an improvement in accuracy of the system.

The output of the synchronization block 306 may be provided to a SVAD module 309 which may be similar to, for example, SVAD module 203 as described above. The output of the SVAD module 309 may be provided to a comparator 310. The comparator 310 may make the on/off decision regarding when a user's voice is active. In some embodiments, the comparator 310 may be digital, while in other embodiment the comparator 310 may be implemented as an analog circuit which may gradually change (e.g., a gain). In some embodiments, the comparator 310 may have hysteresis to avoid multiple switching around a given trigger-level. The output of the comparator 310 may be provided to a number of modules. In some embodiments, one or more of the modules may also receive further input 312 from a microphone such as microphone 302.

One such module may include a table 311 that maps the output of the comparator 310 to a set gain reduction. In some embodiments, the table 311 may produce an analog signal that changes the gain incrementally rather than a digital on/off.

Another such module may be an auto-tune or pitch-correction module 320 which may be configured to alter the pitch of the user's voice in one or more ways. Another such module may be a reverb module 313 which is configured to add reverberation to a user's voice to make the voice sound more natural. Another such module may be an equalizer 314 which may be configured to adjust the frequency response of the circuit to accentuate or attenuate one or more frequencies of the user's voice. As may be seen, module 320, 313, and 314 may be sequential, although in other embodiments they may be concurrent or in a different order than depicted.

The output of the modules 320/313/314, as well as the output of the table 311, may be provided to an amplifier 315 which may alter the gain (i.e., the volume) of the sound and, particularly, the user's voice. The output of the amplifier 315, as well as the input 312, may be provided to a mixer 316 which may blend the two signals (or select only one of the signals) which may then be output at 317. The output 317 may be to the user as described with respect to element 204, or to a remote individual as described with respect to elements 205 or 206.

In some embodiments, the output of the comparator 310 may further be provided to an integration module 318, which may integrate the time when the user's voice is active and log how often the user is speaking. Based on the data from the integration module 318, statistical analysis may be performed at 319 which may identify how often the user talks, the loudness of the user's speech, the type of voice of the user, a mood-prediction related to the user, etc. In some embodiments this statistical data may be provided to an application on a user's mobile device so that the user may view it, or it may be uploaded to a remote server for analysis.

Figure 4:
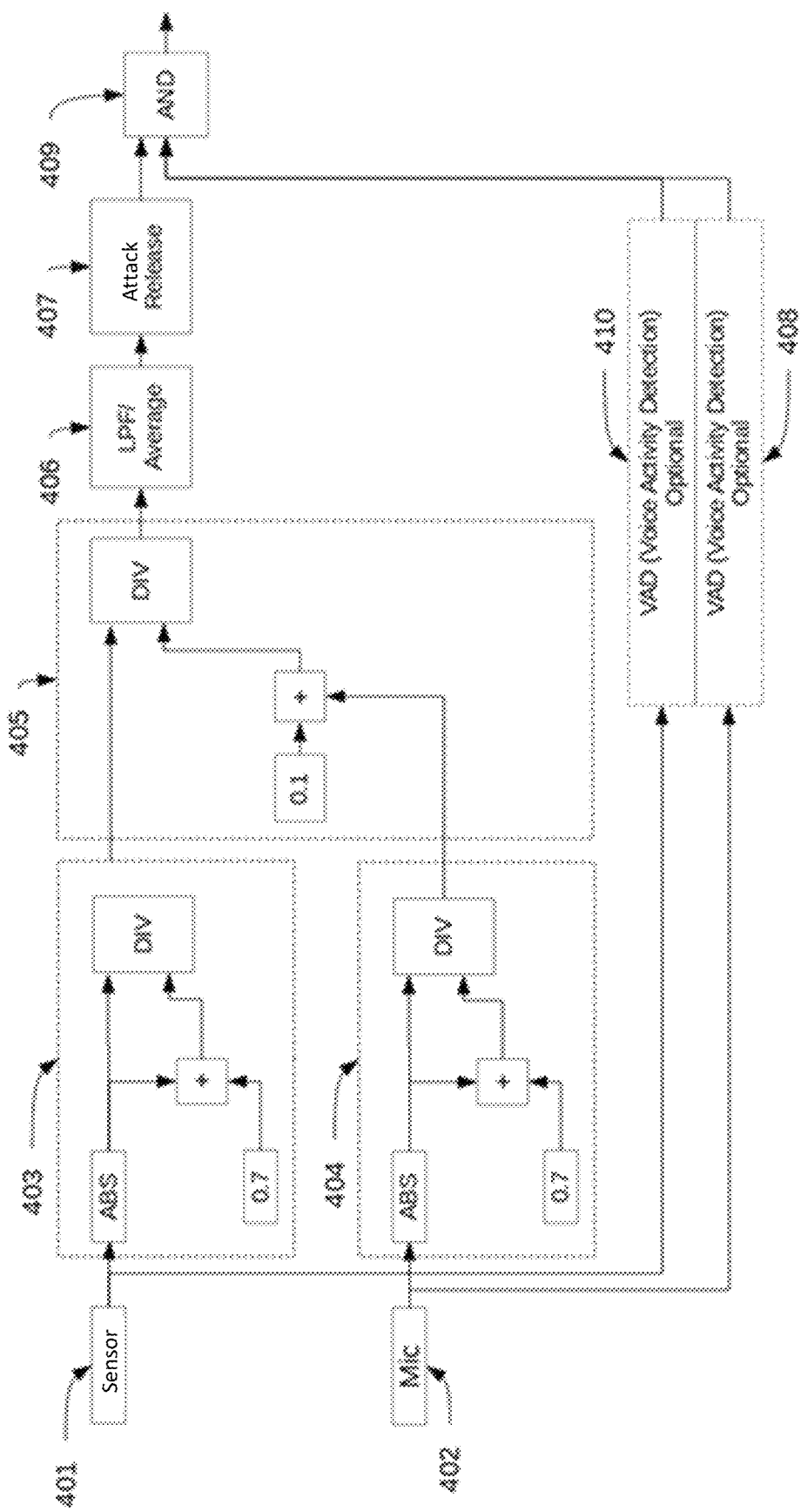
FIG. 4 depicts an example of a self-voice activity detect (SVAD) architecture, in accordance with various embodiments.

FIG. 4 depicts an example of a SVAD architecture, in accordance with various embodiments. Specifically, FIG. 4 may be considered as a more detailed depiction of the SVAD module 309 of FIG. 3.

The architecture may include inputs from an a sensor 401 and a microphone 402 which may be, for example, data produced by a sensor such as sensor 301 and a microphone such as microphone 302. In some embodiments, the inputs to the architecture of FIG. 4 may be received after processing by a decimate block such as decimate block 303 or a synchronization module such as synchronization module 306. Each of the inputs may be provided to a gain module 403/404. In some embodiments, the gain modules 403/404 may be a Wiener gain function block that is to amplify the signals from each input.

The outputs of the gain modules 403/404 may be provided to an amplification module 405 which is configured to amplify the user's voice when both the sensor and the microphone are detecting voice activation. The amplification module 405 may output to a filter module 406 which may act as an LPF or may be configured to average the signal received from the amplification module 405. The filter module 406 may output to an attack/release module 407 which may apply an attack/release function to the signal. This function may be desirable because voice activation may take multiple milliseconds, and so the attack/release function may serve to apply hysteresis to the signal.

In some embodiments, it may be desirable to include voice activity detection (VAD) modules 408 and 410, which may apply a VAD algorithm to the microphone input 402 and the sensor input 401, respectively. The VAD algorithms of modules 408 and 410 may identify whether voice is present based on the sensor input 401 or the microphone input 402. The output of modules 408 and 410 may be combined together by an AND module 409, along with the output of the attack/release module 407. By using one or both of the modules 408 and 410, the modules 408 and 410 may act as a secondary check to identify whether the user is speaking, and therefore the overall SVAD module may be more resistant to noise. It will be noted that, in other embodiments and other configurations, a different module may additionally or alternatively be used. For example, the AND module 409 may be replaced by, or supplemented by, another function such as OR, a comparator, etc.

Figure 5:
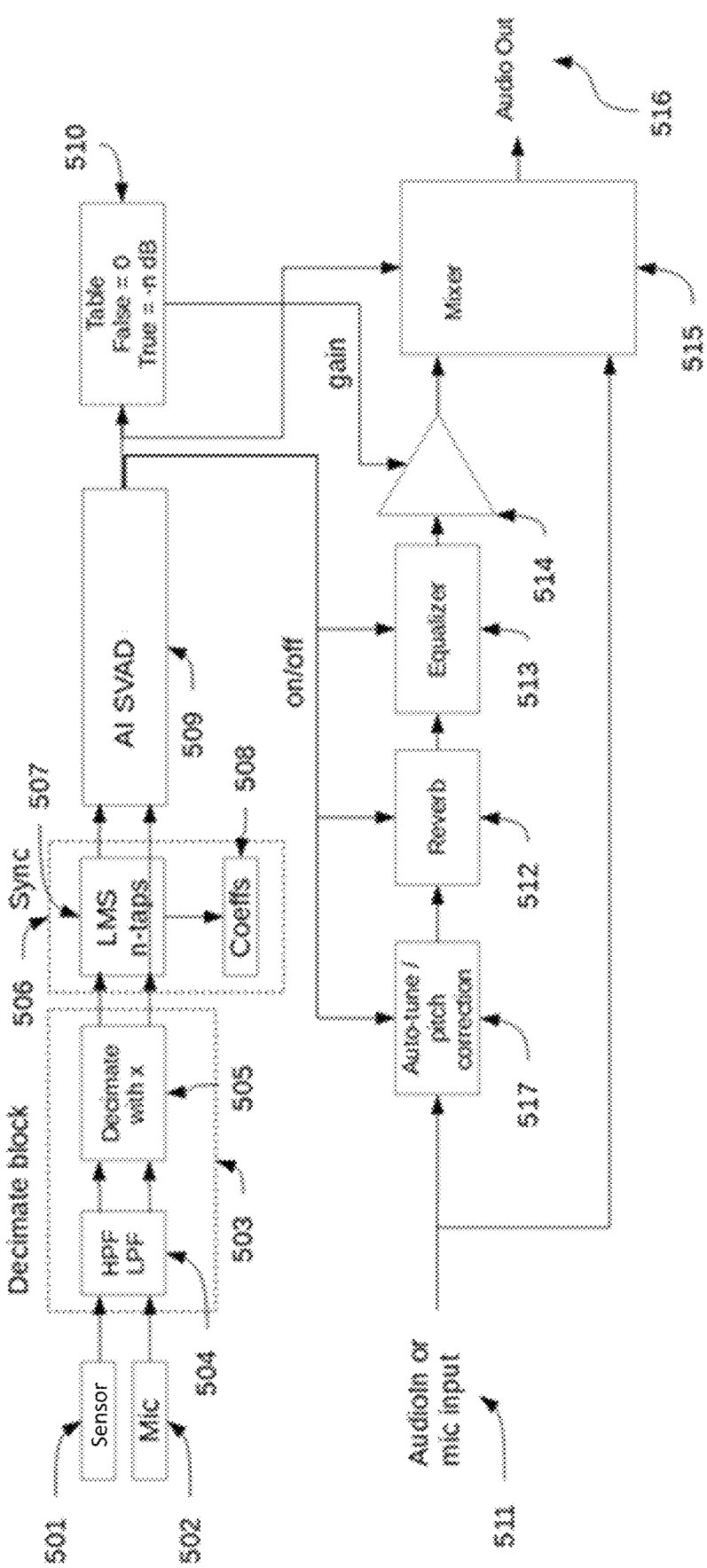
FIG. 5 depicts an alternative example block diagram of a UVC architecture, in accordance with various embodiments.

FIG. 5 depicts an alternative example block diagram of a UVC architecture, in accordance with various embodiments. Generally, FIG. 5 includes elements that may be considered similar to previously described elements of FIG. 3. Specifically, FIG. 5 depicts sensors 501, microphones 502, decimate block 503, filter 504, decimate module 505, synchronization block 506, delay/gain block 507, n-coefficients 508, table 510, input 511, auto-tune/pitch-correction module 517, reverb module 512, equalizer 513, amplifier 514, mixer 515, and output 516 which may be respectively similar to, and share one or more characteristics with, sensor(s) 301, microphone(s) 302, decimate block 303, filter 304, decimate module 305, synchronization block 306, delay/gain block 307, n-coefficients 308, table 311, input 312, auto-tune/pitch-correction module 320, reverb module 313, equalizer 314, amplifier 315, mixer 316, and output 317 of FIG. 3.

The architecture of FIG. 5 may also include an AI-based SVAD module 509. The AI-based SVAD module 509 may use a neural network to detect when both the microphone(s) 502 and the sensor(s) 501 measure voice, and then either identify how to process the audio stream or provide feedback to another module (e.g., the mixer 515) that identifies how to process the audio stream and/or processes the audio stream.

Specifically, the AI-based SVAD module 509 may use a neural network to identify different noises in the audio stream. As an example, the AI-based SVAD module 509 could identify a difference between the user's voice and the voice of another individual in the environment, or background noises in the environment. In some embodiments, the AI-based SVAD module 509 may process, or produced a signal that causes another module to process, the noises differently (e.g., muting the user's voice while leaving other sounds generally unaffected). In some embodiments, this processing may occur on a noise-by-noise basis, that is, different noises may be identified and different processing may be performed. In other embodiments, the audio stream may be separated into different frequency bands (e.g., 1 kilohertz (KHz)-2 KHz, 2 KHz-4 KHz, 4 KHz-8 KHz, etc.) and different processing may be performed on different frequency bands. For example, one band may be muted or have a different equalization applied than another band. This mode of operation may be referred to as operating in the frequency domain. In other embodiments, however, the AI-based SVAD module 509 may operate in the time domain in a manner similar to the SVAD module 309 of FIG. 3. Other variations may be present.

Figure 6:
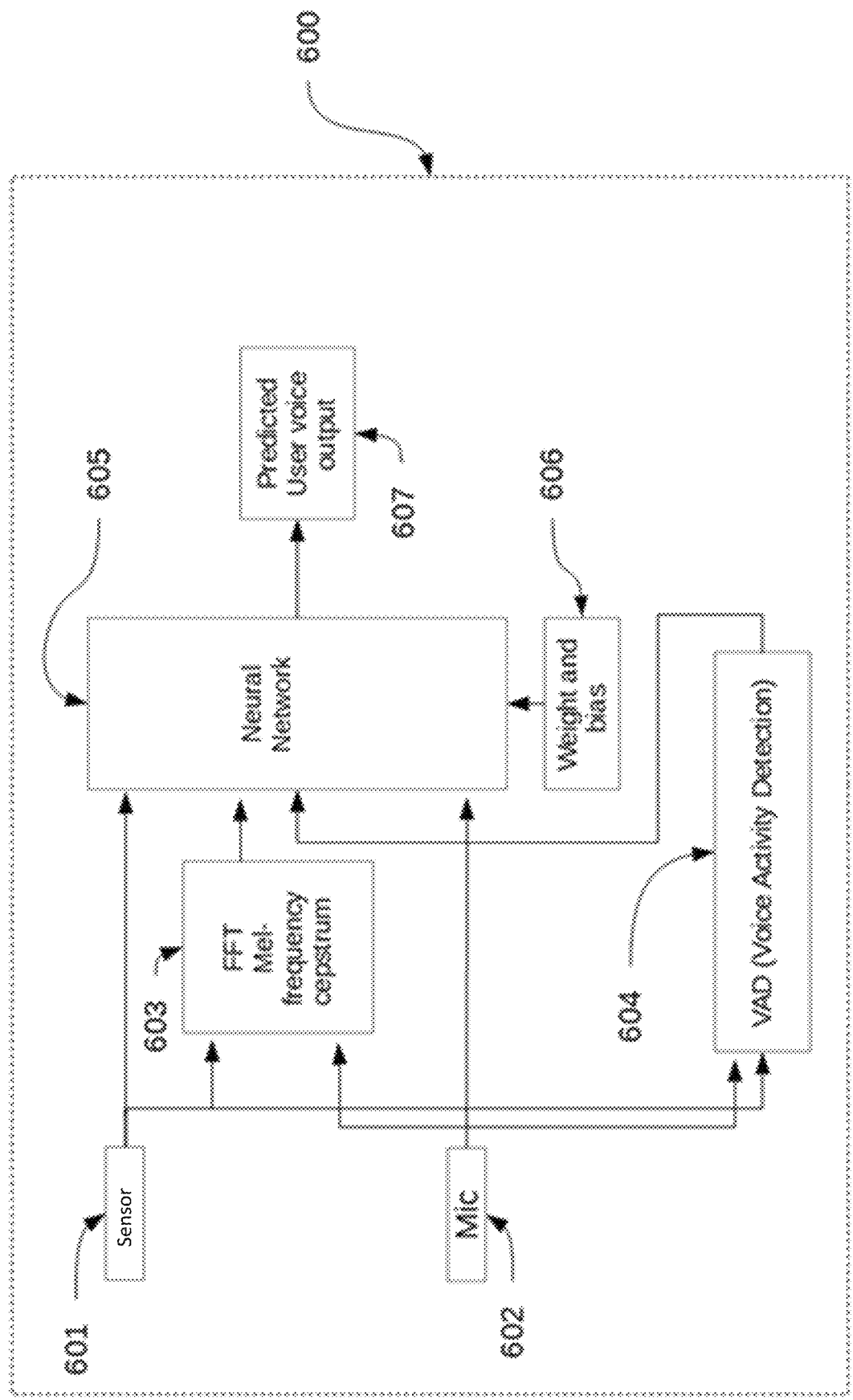
FIG. 6 depicts an alternative example of a SVAD architecture, in accordance with various embodiments.

FIG. 6 depicts an alternative example of a SVAD architecture 600, in accordance with various embodiments. Specifically, FIG. 6 is a more detailed depiction of the AI-based SVAD module 509 of FIG. 5. The SVAD architecture includes a sensor input 601 and a microphone input 602 which may be similar to, and share one or more characteristics with, sensor input 401 and microphone input 602. The SVAD architecture may further include a transformation module 603. The transformation module 603 may be configured to transform the input signals from the time domain to a frequency domain. In some embodiments, this transformation may include the use of a fast Fourier transform (FFT) and/or some other type of transformation. In some embodiments, the conversion may include converting the signal to a Mel-frequency cepstrum, that is, a representation of the short-term power spectrum of a sound based on a linear cosine transform of a log power spectrum on a nonlinear mel scale of frequency. The architecture may further include a VAD module 604, which may be similar to, and share one or more characteristics with, one or both of VAD modules 408 and 410.

The output of the VAD module 604 and the transformation module 603 may be provided to a neural network module 605. The neural network module 605 may include logic (hardware, software, firmware, or some combination thereof) that is configured to detect a user voice based on the input signals from the sensor input 601, the microphone input 602, and the VAD module 604. The neural network module 605 may further take, as an input, information 606 related to one or more weights or other information which it may use to identify the user's voice. In some embodiments, the neural network module 605 may be configured to update or otherwise alter these weights, while in other embodiments the weights may be updated based on information received from a server or mobile device that is remote from the wearable audio device. In some embodiments, the neural network may be a convolutional neural network (CNN), while in other embodiments the neural network may be a recurrent neural network. In other embodiments, the neural network may be some other type of neural network, or a combination of different types of neural networks. The output of the neural network module 605 may be a predicted user voice output 607 which may then be provided to other elements of the UVC architecture of FIG. 5 as depicted above. In some embodiments, the output 607 may be time domain, frequency domain, or a combination thereof.

Figure 9:
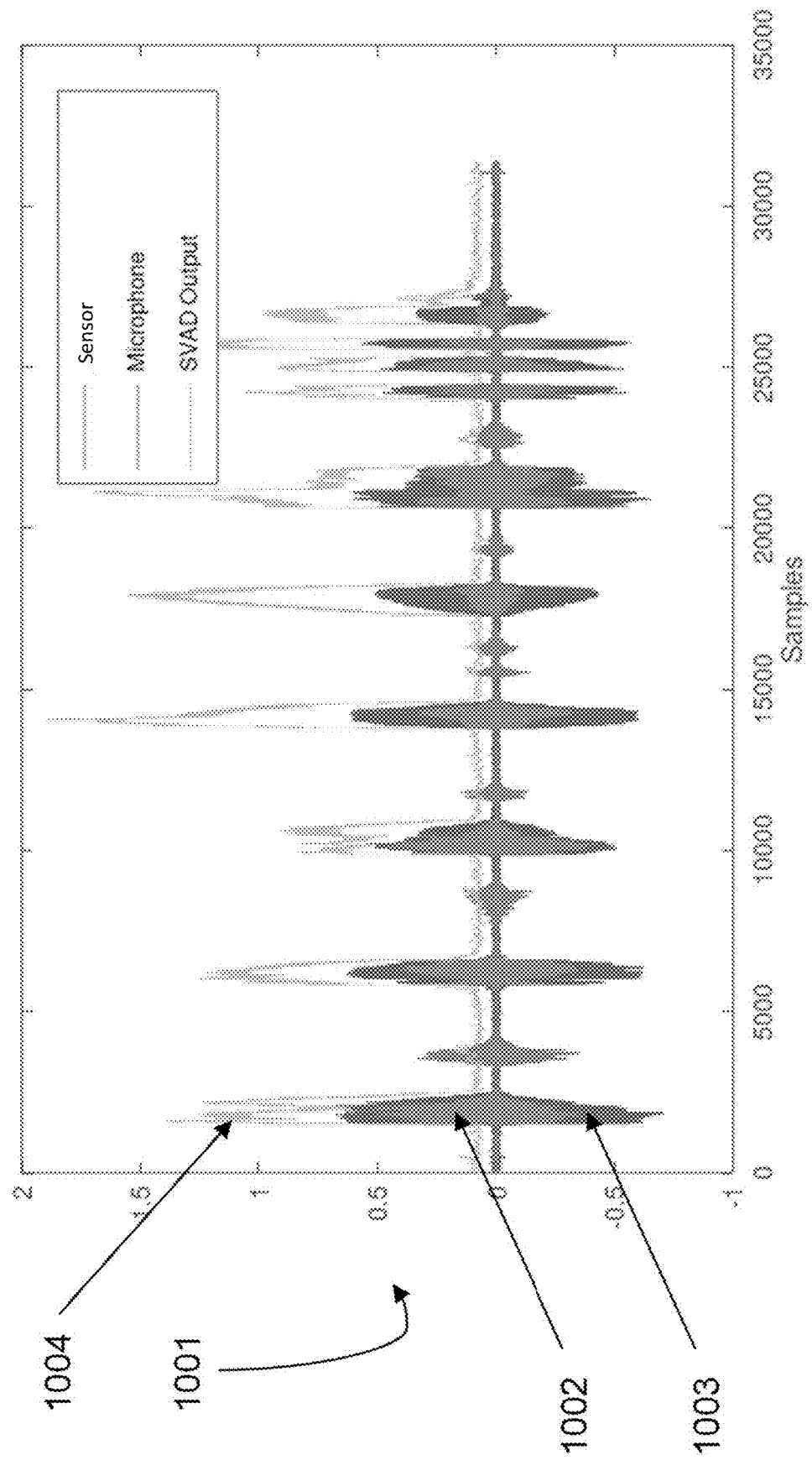
FIG. 9 depicts an example of sensor measurements and an artificial intelligence (AI)-based SVAD output in accordance with various embodiments.

FIG. 9 depicts an example 1001 of sensor measurements and an AI-based SVAD output in accordance with various embodiments. Specifically, FIG. 9 depicts a signal 1002 related to a microphone and a signal 1003 related to a sensor. The signals 1002 and 1003 may be, for example, the signals received by the neural network module 605 after they are converted and output by the transformation module 603. As may be seen, the signals 1002 and 1003 may be generally similar to one another in terms of shape. Signal 1004 may be a signal output by, for example, neural network modules 409 or 605 as predicted user voice output 607. As may be seen, signal 1004 may have a generally similar shape to signals 1002 and 1003, but a significantly higher signal-to-noise ratio. The higher signal-to-noise ratio may be desirable as it may allow for more accurate processing of the signal by, for example, one or more of the modules 512/513/514/517/etc.

Figure 7:
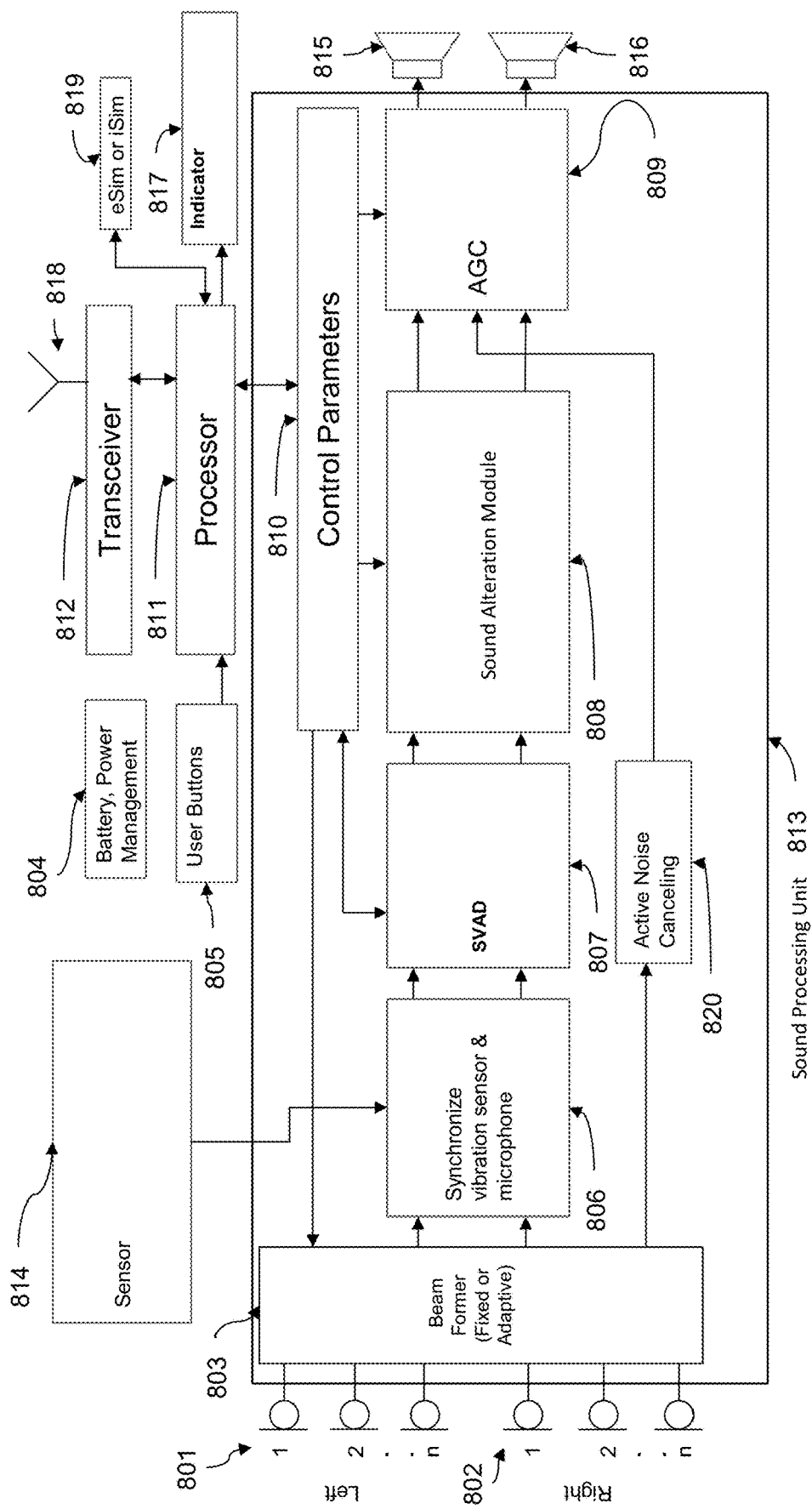
FIG. 7 depicts an alternative high-level architecture of a UVC system, in accordance with various embodiments.

FIG. 7 depicts an alternative high-level architecture of a UVC system, in accordance with various embodiments. It will be understood that the embodiment of FIG. 7 is intended as an example embodiment, and other embodiments may vary from that depicted in FIG. 7. For example, in some embodiments the wearable audio device may include more or fewer elements than depicted, elements in a different configuration, etc. In some embodiments all of the elements in FIG. 7 may be located in a single housing, whereas in other embodiments the elements may be distributed across two or more physical housings while remaining communicatively coupled to one another. The wearable audio device may be similar to, for example, the wearable audio device of FIG. 1. Generally, the wearable audio device of FIG. 7 may be configured to implement the UVC architecture of FIG. 3 and the SVAD architecture of FIG. 4.

The wearable audio device may include one or more microphones 801 and 802, which may be similar to microphone(s) 102 or some other microphones depicted or discussed herein. As shown, the wearable audio device may include a total of six microphones (respectively labeled "1," "2," and "3"). The microphones 801 and 802 may be located on opposite sides of the wearable audio device. For example, microphones 801 may be located on the left side of the wearable audio device while microphones 802 may be located on the right side of the wearable audio device.

The wearable audio device may further include one or more speakers 815 and 816, which may be similar to speakers 103. The speakers 815 or 816 may be used to output sound. In various embodiments, the speakers 815 or 816 may be implemented as a single speaker per ear, multiple speakers to create three-dimensional (3D) awareness by directing the sound in the ear, etc. In some embodiments, if multiple speakers are present, the multiple speakers may be configured in an array to perform beamforming of the output sound toward the user.

The wearable audio device may further include a processor 811, which may be similar to processor 105 of FIG. 1. The processor 811 may be, for example, a CPU a processing core, etc. as described above. Generally, the processor 811 may control the wearable audio device and interface to a mobile device of a user such as the mobile devices described above.

The wearable audio device may further include a sound processor unit 813 which may include a variety of modules as will be described in detail below. Generally, an audio signal may traverse between the different modules of the sound processor 813 (e.g., from the microphones 801/802 to the speakers 815/816) as depicted in FIG. 7 and as described below. Generally, the sound processor unit 813 may be composed of or otherwise include an application-specific integrated circuit (ASIC), a digital signal processor (DSP), a processor (CPU, processor core, etc.), or some other type of logic or processing unit. At a high level, the sound processor unit 813 may run the algorithm used to process the signals from the microphones 801 or some other audio signals. The processed signals may be output to the processor 811, the speakers 815/816, or some other element. More generally, the sound processor unit 813 may be optimized to run one or more elements of the UVC or SVAD architectures described herein.

The microphones 801/802 may be communicatively coupled with a beamforming module 803 of the sound processing unit 813. The beamforming module 803 may calculate one or more parameters for use by the speakers 815/816 during generation and transmission of an audio signal by speakers 815/816. The parameters may be fix control parameters or adaptive beamforming parameters that adapt to the environment. The adaptive beamforming parameters may be based on information collected from an orientation sensor and may be affected by or compensate for head orientation. The beamforming module may operate in time domain or frequency domain.

The wearable audio device may further include one or more sensors 814, which may be similar to sensor(s) 104 of FIG. 1 or some other sensor described herein. Specifically, the sensor(s) 814 may include a vibration sensor, an accelerometer, a piezoelectric sensor, or some other type of non-acoustic sensor.

The sound processing unit 813 may include a synchronization module 806 which is configured to accept the inputs from the sensor(s) 814 and the beamforming module 803. The synchronization module may be similar to, for example synchronization module 306 of FIG. 3. The output of the synchronization module 806 may be provided to a SVAD module 807 which may be similar to, for example, SVAD module 309 of FIG. 3.

The sound processing unit 813 may further include a sound alteration module 808. The sound alteration module 808 may be configured to perform one or more functions such as reverb (similar to reverb module 313), equalization (similar to equalization module 314), pitch correction (similar to module 320), sound volume amplification or reduction (similar to amplifier 315), or some other sound alteration function.

The sound processing unit 813 may further include a synthesis and automatic gain control (AGC) module 809. The AGC module 809 may convert the signal from the frequency domain to the time domain. The time domain signal may then be output to the speakers 815/816 for playback. In some embodiments, and although not explicitly depicted in FIG. 7, the AGC module 809 may further output the signal to processor 811 for further processing, storage, transmission to mobile phone, transmission to the server, etc.

In some embodiments, the sound processing unit 813 may further include an active noise canceling module 820 communicatively coupled between the beamforming module 803 and the AGC module 809. The active noise canceling module 820 may be operable to cancel out external noise by using feedback, feed-forward, or both in a hybrid version for maximum noise cancelation.

The sound processing 813 may further include a storage which may store control parameters 810. The storage may be, for example, a volatile memory, a nonvolatile memory (NVM), or some other type of memory. For example, the storage may be a flash card, static random-access memory (SRAM), a double data rate (DDR), etc. The control parameters 810 may be used to control or otherwise provide information to various modules such as the beamforming module 803 the synchronization module 806, the SVAD module 807, the sound alteration module 808, the AGC 809, or some other module.

The control parameters 810 may be communicatively coupled with, and controlled by, the processor 811. In some embodiments, the processor 811 may provide information or parameters to the control parameters 810 which may then be used during operation of the wearable audio device. In some embodiments, the parameters may be considered "fixed" while in other embodiments the parameters may be dynamically updated by the processor 811 based on changing conditions or factors of the wearable audio device (e.g., information provided by various sensors of the wearable audio device, information received from the neural network, etc.). In some embodiments, although the processor 811 is only depicted as directly coupled with the control parameters 810 of the sound processing unit 813, in other embodiments the processor 811 may be directly communicatively coupled with one or more other modules of the sound processing unit 813.

The wearable audio device may further include a battery/power-management module 804. The battery/power-management module 804 may be or include a power source such as a single battery (e.g., a lithium ion battery or some other type of battery), or it may include one or more supporting circuitry elements such as voltage regulators, a battery gauge, a battery charging system, etc.

The wearable audio device may include one or more user-accessible buttons 805. The buttons 805 may be, for example, located on the side of the wearable audio device. The buttons 805 may be used by a user to change modes of the wearable audio device, provide feedback, etc. The feedback from the buttons 805 may be part of the user-provided feedback that is provided to an application related to the wearable audio device as described above. It will be understood that even though the term "buttons" is used, in other embodiments some other form of input device may be used to provide feedback to the processor 811. As described above, a neural network may take user feedback as an input. In some embodiments, data related to activation of the buttons 805 may be provided to the neural network (e.g., as implemented by one or more of the wearable audio device, a mobile device, or a server) to allow the neural network to identify when a user is speaking.

The wearable audio device may further include one or more transceiver modules 812 coupled with one or more antennas 818. The transceiver modules 812 may include, for example, separate transmit or receive modules (not shown) that are configured to transmit or receive one or more wireless signals as discussed herein. In other embodiments, the transceiver module 812 may be a unitary module configured to both transmit and receive wireless signals. The antenna(s) 818 may be physical elements configured to transmit or receive the wireless signals over the air. The wearable audio device may further include a subscriber identity module (SIM) module 819 which may be communicatively coupled either directly or indirectly with the transceiver module 812. The SIM module 819 may be, for example, an embedded SIM (eSIM), an integrated SIM (iSIM), or some other type of module that allows for, facilitates, or otherwise supports wireless communication.

The wearable audio device may further include a sound level indicator 817. The sound level indicator 817 may be configured to display a level of sound pressure (e.g., a sound level as measured in decibels (dB)) in the environment. In some embodiments, the sound level indicator 817 may be configured to display this information based on a current level or a level with a given time period such as a day, a week, a month, etc. The sound level indicator 817 may be, for example, a light-emitting diode (LED), a multi-color LED, a graphical display, a voice message, an audio signal, etc. In some embodiments, the sound level indicator 817 may also act as an air quality indicator as described herein. For example, the air quality indicator may similar display information related to current air quality or air quality over a given time period.

Figure 8:
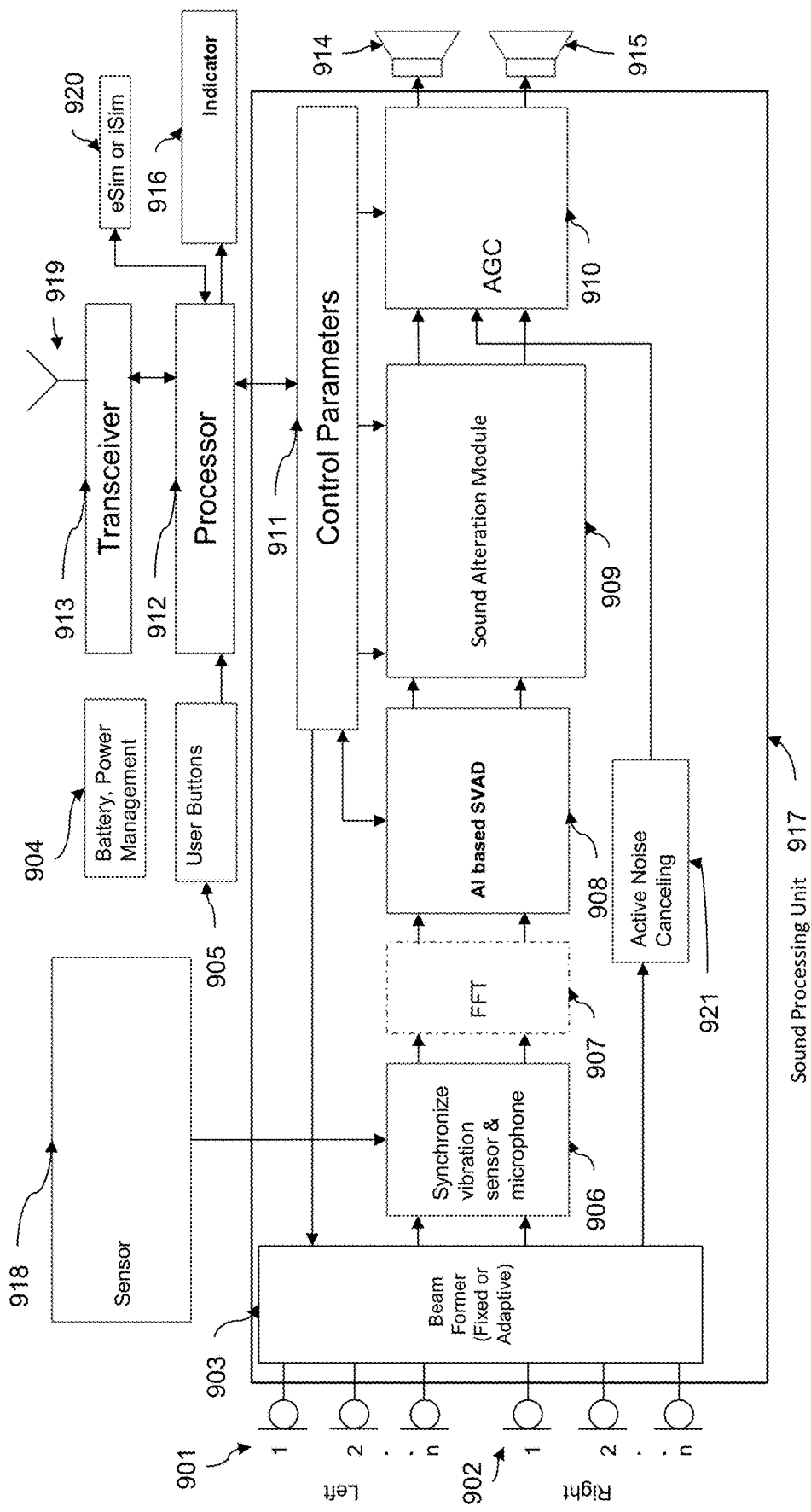
FIG. 8 depicts an alternative high-level architecture of a UVC system, in accordance with various embodiments.

FIG. 8 depicts an alternative high-level architecture of a UVC system, in accordance with various embodiments. Generally, the architecture may be similar to, and share one or more characteristics with the architecture of FIG. 7. However, the architecture of FIG. 8 may be configured to implement the UVC architecture of FIG. 5 and the SVAD architecture of FIG. 6. The architecture of FIG. 8 may include microphones 901/902, beamforming module 903, battery/power-management module 904, buttons 905, synchronization module 906, sound alteration module 909, AGC module 910, control parameters 911, processor 912, transceiver module 913, speakers 914/915, sound level indicator 916, sound processing unit 917, sensor(s) 918, antennas 919, SIM module 920, and active noise canceling module 921, which may be respectively similar to, and share one or more characteristics with, Microphones 801/802, beamforming module 803, battery/power-management module 804, buttons 805, synchronization module 806, sound alteration module 808, AGC module 809, control parameters 810, processor 811, transceiver module 812, speakers 815/816, sound level indicator 817, sound processing unit 813, sensor(s) 814, antennas 818, SIM module 819, and active noise canceling module 820.

Additionally, the architecture of FIG. 8 may include a transformation module 907 which may be similar to, and share one or more characteristics with, transformation module 603. The architecture of FIG. 8 may further include an AI-based SVAD module 908 which may be similar to, and share one or more characteristics with, the AI-based SVAD module 509 of FIG. 5. In some embodiments, the transformation module 907 may not be a separate module (as depicted in FIG. 8), but rather may be an element of the AI-based SVAD module 908 as described with respect to, for example, FIG. 6.

It will be understood that while various elements of FIG. 7/8 and, particularly, various modules of the sound processing units 813 or 917 are depicted as separate modules, in some embodiments certain elements or modules may be elements of a single physical structure. For example, the various modules may be implemented as software on a single processor, as separate processing chips, as firmware, or as some combination thereof.

Figure 10:
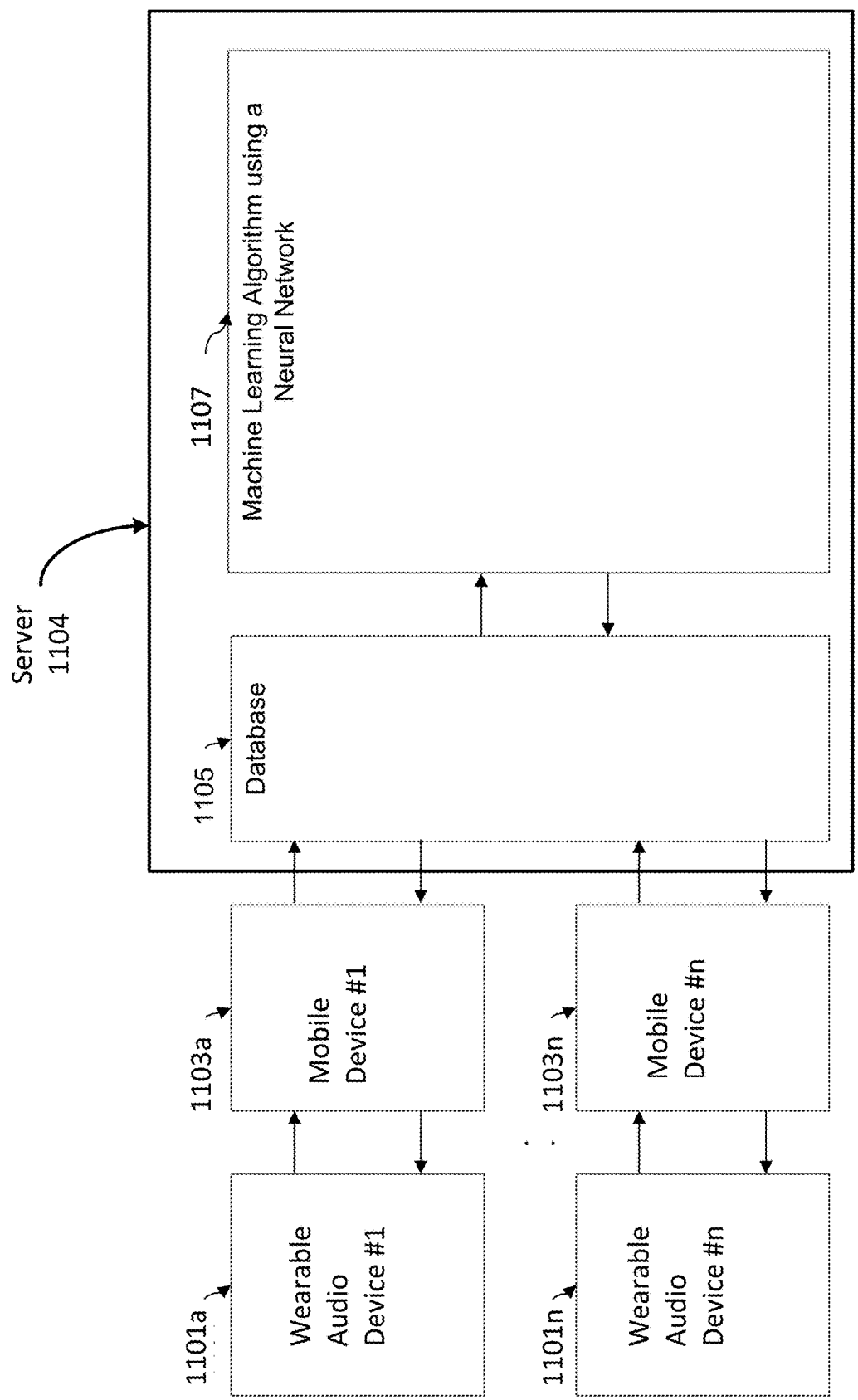
FIG. 10 depicts an example high-level system architecture in accordance with various embodiments.

FIG. 10 depicts an example high-level system architecture in accordance with various embodiments. Specifically, FIG. 10 is intended to depict an example communication ecosystem in which a wearable audio device such as that of FIG. 1 may be present. The system architecture may include a number of wearable audio devices such as wearable audio devices 1101a-1101n, which may be respectively similar to the wearable audio device 101 of FIG. 1. Specifically, respective ones of the wearable audio devices 1101a-1101n may be configured with one or more of the UVC or SVAD architectures described herein. It will be understood that the designation "n" is intended to refer to an un-specified number of wearable audio devices which may be present in the system. The wearable audio devices 1101a-1101n may be, for example, earbuds, in-ear headphones, over-ear headphones, or some other type of wearable audio device. In some embodiments, different ones of the different wearable audio devices 101a-101n may have different form factors. For example, one of the wearable audio devices may be a singular earbud, while another of the wearable audio devices may be a pair of earbuds, a type of headphones, etc.

Respective ones of the wearable audio devices 1101a-1101n may be communicatively coupled with a mobile device 1103a-1103n. In the embodiment of FIG. 10, the mobile device may be a mobile phone. In other embodiments, one or more of the mobile devices may be some other type of mobile device such as a smartwatch, a PDA, or some other type of mobile device. In some embodiments, wearable audio device(s) 1101a-1101n may be communicatively coupled with a respective mobile device 1103a-1103n through a short-range wireless protocol such as Bluetooth, WIFI, or some other wireless protocol. In some embodiments, one or more of the wearable audio devices 1101a-1101n may be communicatively coupled with a mobile device 1103a-1103n through a wired connection (e.g., such as a headphone jack or some other wired connection that is removable or hardwired). In some embodiments, one or more of the wearable audio devices 1101a-1101n may share a form factor with a mobile device such that a separate mobile device is un-necessary. In other words, one or more of the wearable audio devices 1101a-1101n may include a cellular wireless transceiver and processor such that the mobile phone is un-necessary. In this embodiment, the wearable audio device may be configured to communicate directly with a cellular tower via a protocol such as a third generation (3G) protocol, fourth generation (4G) protocol, fifth generation (5G) protocol, or some other type of wireless cellular protocol.

The mobile devices 1103a-1103n may be communicatively coupled with a server 1104 which may include a database 1105 and a machine-learning module 1107 which may be based on a neural network. The mobile devices 1103a-1103n may be communicatively coupled with the server 1104 by way of one or more wireless protocols such as a cellular protocol as described above, or some other wireless protocol. Generally, the database 1105 may store information related to one or more parameters, weights, historical audio data, historical geographic data, etc. The machine-learning module 1107 may perform one or more calculations related to the information stored in the database 1105 to provide one or more audio parameters to the wearable audio device(s) 1101a-1101n. Operation of the machine-learning module 1107 and the database 1105 is provided in greater detail below.

In general, it will be understood that although the server 1104 is depicted as a unitary element, in some embodiments the server 1104 may include a plurality of networked servers, a plurality of server blades, etc. Such an embodiment may be referred to as a "server farm." Additionally, it will be understood that the database 1105 may be stored on a plurality of non-transitory memories such as a DDR memory, a NVM, or some other type of memory. Similarly, it will be understood that the machine-learning module 1107 may be enabled across one or more processors/CPUs/GPUs/processor cores/etc. of the one or more servers 1104. Typically, such an embodiment may be scalable such that the machine-learning module 1107, the database 1105, and the server 1104 may be expanded or contracted based on the degree of need of such an embodiment. In some embodiments, the machine-learning module 1107 may be spread across various of the elements of the system architecture and at least part of the machine-learning module 1107 may be offloaded from the server 1104 and stored on a mobile device, a wearable audio device, both, etc. The portion of the machine-learning module 1107 may additionally or alternatively be executed, run, etc. on the mobile device/wearable audio device/etc. as previously described.

Typically, in operation, and as previously described, a wearable audio device (e.g., wearable audio device 1101a) may collect data during usage of sound level, sensor data from sensors on the wearable audio device, statistics from the sound algorithm running on the wearable audio device, sound data (e.g., recorded sound clips), etc. The data may be sent to a mobile device (e.g., mobile device 1103a) where additional data may be added to the payload received from the wearable audio device. The additional data may be, for example, user feedback (e.g., through the application on the mobile device, buttons on wearable), user data, geo-location data, a timestamp, user feedback data, an ID which may be random or fixed, etc. The data packet including the data from the wearable audio device and the mobile device may be transmitted to the server 1104 and appended to the database 1105 for future processing.

The machine-learning module 1107 may process one or more elements of the data received from the mobile device (s) 1103*a*-1103*n*. For example, the machine-learning module 1107 may identify one or more control parameters (e.g., the control parameters discussed with respect to elements 810 or 911) which may relate to audio processing, voice identification, etc. The machine-learning module 1107 may also calculate control parameters for the environment in which a specific wearable audio device is located, calculate audio parameters for use by a wearable audio device (e.g., beamforming parameters or some other parameter), etc. In some embodiments, the user feedback may be used to train the machine-learning module 1107. For example, the machine-learning module 1107 may take into account user application settings, User Voice detection training, the quality of sound, etc. As a result, the machine-learning module 1107 may generate the one or more control parameters which may be output to the wearable audio device(s) 1101*a*-1101*n*. The control parameters may include, for example, control parameters such as a beamformer parameter, an equalizer setting, a reverb setting, a noise cancelation setting, a noise reduction setting, or some other control parameter discussed herein.

It will be understood that the various configurations and architectures depicted with respect to FIGS. 1-10 are intended as non-limiting examples of the subject matter of the present disclosure. Other embodiments may have more or fewer elements, elements in a different configuration than depicted, etc. Other variations may be present.

Figure 11:
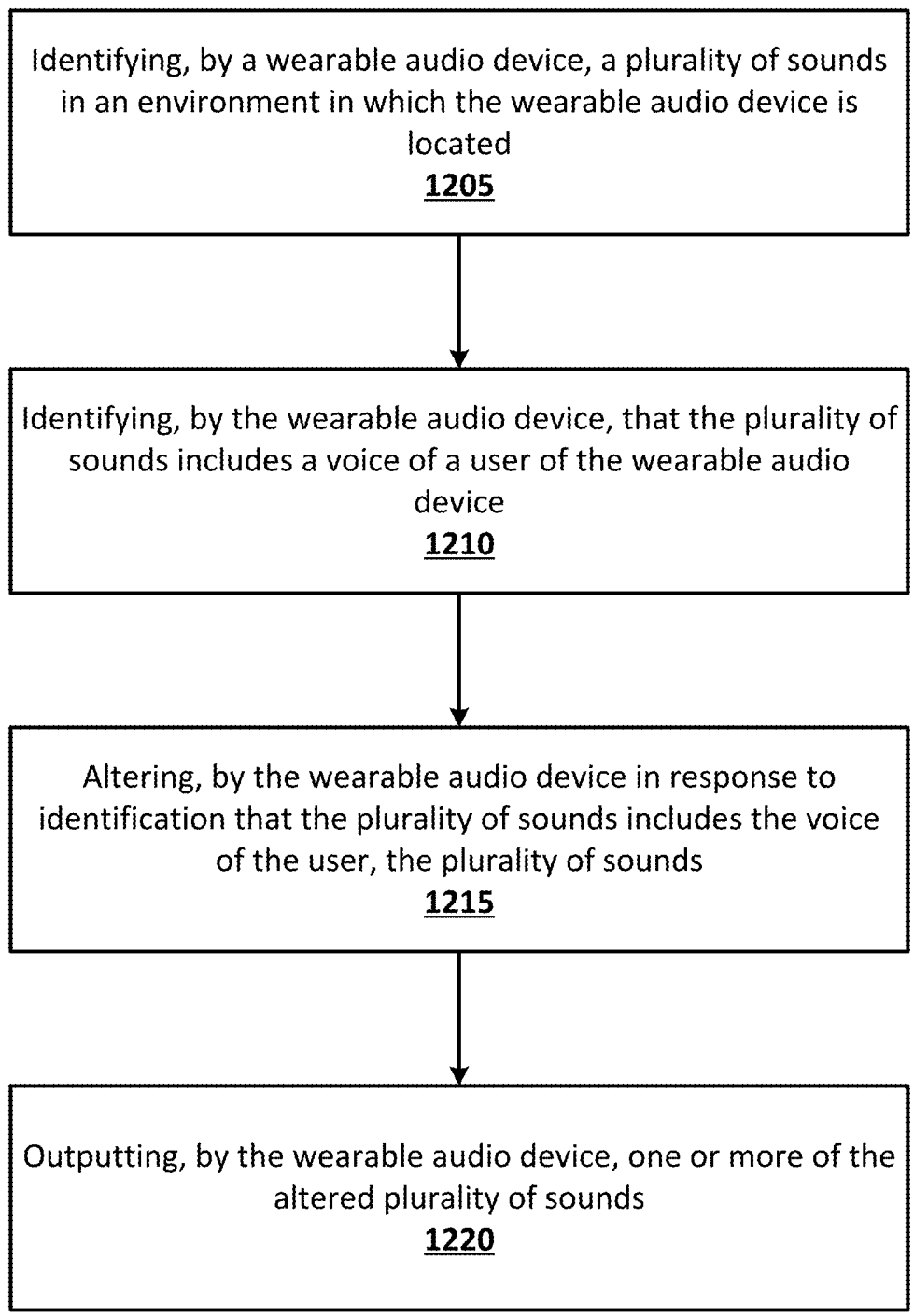
FIG. 11 depicts an example technique for use of a wearable module equipped with a UVC architecture, in accordance with various embodiments.

FIG. 11 depicts an example technique for use of a wearable module that includes a UVC architecture, in accordance with various embodiments. It will be understood that the technique depicted in FIG. 11 is intended as one example of such a technique, and other embodiments may vary. For example, other embodiments may have more or fewer elements, or elements arranged in a different order than depicted. For example, some elements may occur prior to or subsequent to, or concurrently with, other elements of the Figure. Other variations may be present.

The technique may include identifying, at 1205, by a wearable audio device, a plurality of sounds in an environment in which the wearable audio device is located. In some embodiments, this element may be performed by a processor, a SVAD module, an AI-based SVAD module, or some other algorithm, module, or element depicted herein.

The technique may further include identifying, at 1210, by a wearable audio device, that the plurality of sounds includes a voice of a user of the wearable audio device. This identification may be done, for example, by a SVAD module such as those depicted in FIG. 4 or 6. Specifically, the identification may be done on the basis of inputs from a sensor, a microphone, a VAD module, some other source, or some combination thereof. Specifically, in some embodiments this identification may be performed by the neural network 605 or based on the output of the AND module 409.

The technique may further include altering, by the wearable audio device in response to identification that the plurality of sounds includes the voice of the user, the plurality of sounds at 1215. As previously described, this alteration may include alteration of the entire audio stream (e.g., all of the identified sounds) or some portion thereof. For example, the alteration may only include alteration of one or two specific sounds such as the voice of the user or the background noise, or alteration of only a specific frequency band of sounds in the audio stream. In some embodiments, the alteration may include different alterations to different sounds (e.g., increasing volume of one sound while decreasing volume of another) or different alterations to different frequency bands. In some embodiments these alterations may be performed by various elements of the UVC architectures depicted in FIG. 3 or 5, or some other element herein. Other variations may be present in other embodiments as described herein.

The technique may further include outputting, by the wearable audio device at 1220, one or more of the altered plurality of sounds. In some embodiments this outputting may include outputting one or more of the sounds to the user of the wearable audio device, e.g. through speakers such as speakers 103 or some other speakers described herein. In some embodiments, the outputting may include outputting the sound to another individual that is remote from the user, for example through a phone call, gaming, or some other format as described above. This outputting may be performed by, for example, transceiver modules 812/913 and antennas 818/919.

EXAMPLES OF VARIOUS EMBODIMENTS

Example 1 includes a method comprising: identifying, by a wearable audio device, a plurality of sounds in an environment in which the wearable audio device is located; identifying, by the wearable audio device, that the plurality of sounds includes a voice of a user of the wearable audio device; and altering, by the wearable audio device in response to identification that the plurality of sounds includes the voice of the user, playback of the plurality of sounds to the user.

Example 2 includes the method of example 1, or some other example herein, wherein altering playback of the plurality of sounds includes decreasing the volume of one or more sounds of the plurality of sounds.

Example 3 includes the method of example 1, or some other example herein, wherein altering playback of the plurality of sounds includes altering sounds in a first pre-identified frequency band and not altering sounds in a second pre-identified frequency band.

Example 4 includes the method of example 1, or some other example herein, wherein altering playback of the plurality of sounds includes altering volume of all sounds of the plurality of sounds.

Example 5 includes the method of example 1, or some other example herein, wherein altering playback of the plurality of sounds includes: altering a volume of a first sound related to the voice of the user; and not altering a volume of a second sound that is not related to the voice of the user.

Example 6 includes the method of example 1, or some other example herein, wherein: identification of the plurality of sounds is based on detection of the plurality of sounds by a microphone of the wearable audio device; and identification that the plurality of sounds includes the voice of the user is based on detection that the user is speaking by a sensor of the wearable audio device.

Example 7 includes the method of example 6, or some other example herein, wherein the sensor is an accelerometer, a piezoelectric sensor, or a vibration sensor.

Example 8 includes one or more non-transitory computer-readable media comprising instructions that, upon execution of the instructions by one or more processors of a wearable audio device, are to cause the wearable audio device to: identify, based on a non-acoustic sensor that is in physical contact with a user of the wearable audio device, that a user is speaking; alter, based on the identification that the user is speaking, an audio recording recorded by a microphone of the wearable audio device, wherein the audio recording is related to an environment in which the wearable audio device is located; and output the audio recording.

Example 9 includes the one or more non-transitory computer-readable media of example 8, or some other example herein, wherein alteration of the audio recording includes un-muting the audio recording.

Example 10 includes the one or more non-transitory computer-readable media of example 8, or some other example herein, wherein alteration of the audio recording includes: un-muting sounds in a first frequency band of the audio recording; and not un-muting sounds in a second frequency band of the audio recording that is different than the first frequency band.

Example 11 includes the one or more non-transitory computer-readable media of example 8, or some other example herein, wherein alteration of the audio recording includes removal of one or more sounds that are identified as un-related to a voice of the user.

Example 12 includes the one or more non-transitory computer-readable media of example 8, or some other example herein, wherein the non-acoustic sensor is an accelerometer.

Example 13 includes the one or more non-transitory computer-readable media of example 8, or some other example herein, wherein the non-acoustic sensor is a vibration sensor.

Example 14 includes the one or more non-transitory computer-readable media of example 8, or some other example herein, wherein the non-acoustic sensor is a piezoelectric sensor.

Example 15 includes a wearable audio device comprising: a microphone to detect a plurality of sounds in an environment in which the wearable audio device is located; a non-acoustic sensor to detect that a user of the wearable audio device is speaking; and one or more processors communicatively to alter, based on an identification by the non-acoustic sensor that the user of the wearable audio device is speaking, one or more of the plurality of sounds to generate a sound output.

Example 16 includes the wearable audio device of example 15, or some other example herein, wherein the wearable audio device further comprises speakers to play back the sound output to the user.

Example 17 includes the wearable audio device of example 16, or some other example herein, further comprising an occlusion valve coupled with the speakers, wherein the one or more processors are to alter a configuration of the occlusion valve based on the identification that the user of the wearable audio device is speaking.

Example 18 includes the wearable audio device of example 15, or some other example herein, wherein the wearable audio device further comprises a transceiver to transmit an indication of the sound output to an electronic device that is remote from the wearable audio device.

Example 19 includes the wearable audio device of example 15, or some other example herein, wherein the one or more processors are to: identify, based on a neural network, a first sound of the plurality of sounds that corresponds to a voice of the user; and identify, based on the neural network, a second sound of the plurality of sounds that is different from the voice of the user.

Example 20 includes the wearable audio device of example 19, or some other example herein, wherein the processor is to alter an acoustic property of one of the first sound and the second sound while not altering the other of the first sound and the second sound.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A method comprising:
    identifying, by a wearable audio device, a plurality of sounds in an environment in which the wearable audio device is located, wherein the plurality of sounds are captured by a microphone of the wearable audio device;
    identifying, by a model of a neural network related to the wearable audio device, that the plurality of sounds includes a voice of a user that is wearing the wearable audio device; and
    altering or facilitating alteration of, by the model in response to identification that the plurality of sounds includes the voice of the user, playback of the plurality of sounds to the user, wherein altering playback of the plurality of sounds to the user includes decreasing a volume of playback of the voice of the user.

2. The method of claim 1, wherein alteration of playback of the plurality of sounds includes decreasing volume of one or more sounds of the plurality of sounds.

3. The method of claim 1, wherein alteration of playback of the plurality of sounds includes altering sounds in a first pre-identified frequency band and not altering sounds in a second pre-identified frequency band.

4. The method of claim 1, wherein alteration of playback of the plurality of sounds includes altering volume of all sounds of the plurality of sounds.

5. The method of claim 1, wherein
    identification that the plurality of sounds includes the voice of the user is based on detection that the user is speaking by a sensor of the wearable audio device.

6. The method of claim 5, wherein the sensor is an accelerometer, a piezoelectric sensor, or a vibration sensor.

7. One or more non-transitory computer-readable media comprising instructions that, upon execution of the instructions by one or more processors of a wearable audio device, are to cause the wearable audio device to:
    identify, based on a non-acoustic sensor that is in physical contact with a user that is wearing the wearable audio device, that the user is speaking;
    alter, based on the identification that the user is speaking, a muted audio recording recorded by a microphone of the wearable audio device, wherein the audio recording is related to an environment in which the wearable audio device is located, and wherein the alteration of the audio recording includes:

un-muting sounds in a first frequency band of the audio recording that is related to a voice of the user; and not un-muting sounds in a second frequency band of the audio recording that is unrelated to the voice of the user; and output the audio recording.

8. The one or more non-transitory computer-readable media of claim 7, wherein alteration of the audio recording includes un-muting the audio recording.

9. The one or more non-transitory computer-readable media of claim 7, wherein the non-acoustic sensor is an accelerometer.

10. The one or more non-transitory computer-readable media of claim 7, wherein the non-acoustic sensor is a vibration sensor.

11. The one or more non-transitory computer-readable media of claim 7, wherein the non-acoustic sensor is a piezoelectric sensor.

12. The one or more non-transitory computer-readable media of claim 7, wherein the alteration of the audio recording is performed by a neural network.

13. A system comprising:
a wearable audio device that includes logic configured to identify a plurality of sounds in an environment in which the wearable audio device is located, wherein the plurality of sounds are captured by a microphone of the wearable audio device; and logic to implement a neural network, wherein the network is configured to generate a model that is operable to:

identify that the plurality of sounds includes a voice of a user that is wearing the wearable audio device; and alter or facilitate alteration of, in response to identification that the plurality of sounds includes the voice of the user, playback of the plurality of sounds to the user, wherein altering playback of the plurality of sounds to the user includes decreasing a volume of playback of the voice of the user.

14. The system of claim 13, wherein alteration of playback of the plurality of sounds includes decreasing volume of one or more sounds of the plurality of sounds.

15. The system of claim 13, wherein alteration of playback of the plurality of sounds includes altering sounds in a first pre-identified frequency band and not altering sounds in a second pre-identified frequency band.

16. The system of claim 13, wherein alteration of playback of the plurality of sounds includes altering volume of all sounds of the plurality of sounds.

17. The system of claim 13, wherein identification that the plurality of sounds includes the voice of the user is based on detection that the user is speaking by a sensor of the wearable audio device.

18. The system of claim 17, wherein the sensor is an accelerometer, a piezoelectric sensor, or a vibration sensor.

19. The system of claim 13, wherein the logic to implement the neural network is an element of the wearable audio device.

* * * * *